United States Patent
Sugita et al.

(10) Patent No.: US 11,615,254 B2
(45) Date of Patent: Mar. 28, 2023

(54) CONTENT SHARING USING ADDRESS GENERATION

(71) Applicant: International Business Machines Corporation, Armonk, NY (US)

(72) Inventors: Masahito Sugita, Saitama (JP); Tohru Hasegawa, Tokyo (JP); Takahito Tashiro, Mitaka (JP); Taihei Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/687,812

(22) Filed: Nov. 19, 2019

(65) Prior Publication Data

US 2021/0149997 A1 May 20, 2021

(51) Int. Cl.
*G06F 15/16* (2006.01)
*G06F 40/55* (2020.01)
*G06T 1/00* (2006.01)
*H04L 9/06* (2006.01)
*G06F 16/955* (2019.01)
*G06F 40/149* (2020.01)

(52) U.S. Cl.
CPC .......... *G06F 40/55* (2020.01); *G06F 16/9558* (2019.01); *G06F 40/149* (2020.01); *G06T 1/0007* (2013.01); *H04L 9/0643* (2013.01)

(58) Field of Classification Search
CPC .... G06F 40/55; G06F 40/149; G06F 16/9558; G06T 1/0007; H04L 9/0643
See application file for complete search history.

(56) References Cited

U.S. PATENT DOCUMENTS

| | | | | |
|---|---|---|---|---|
| 5,572,602 A | * | 11/1996 | Naoi | G06K 9/346 382/178 |
| 8,095,726 B1 | * | 1/2012 | O'Connell | G06F 12/1018 711/108 |
| 8,335,890 B1 | * | 12/2012 | O'Connell | G06F 12/1018 711/216 |
| 9,386,099 B2 | * | 7/2016 | Lee | H04L 67/2842 |
| 9,411,809 B1 | * | 8/2016 | Sabbavarapu | G06F 16/4387 |
| 9,535,651 B2 | | 1/2017 | Khalatian | |
| 10,277,641 B2 | | 4/2019 | Trinh et al. | |
| 2008/0021953 A1 | * | 1/2008 | Gil | G06F 16/955 707/E17.112 |
| 2008/0215563 A1 | * | 9/2008 | Shi | G06F 16/951 |

(Continued)

FOREIGN PATENT DOCUMENTS

| | | |
|---|---|---|
| JP | 10214317 A | 8/1998 |
| JP | 2016042246 A | 3/2016 |

OTHER PUBLICATIONS

"Help—Cisco WebEx Meetings", https://signin.webex.com/collabs/support/nfaqs?_ifra, 1 page, printed Jun. 7, 2019, © 2012 Cisco.

(Continued)

*Primary Examiner* — Yves Dalencourt
(74) *Attorney, Agent, or Firm* — Scott S. Dobson

(57) ABSTRACT

A method for sharing content is provided. An image of content is obtained. An address is generated based on the image using a set of predefined rules. The address is associated with the content. The content is provided to a computing device in response to the computing device accessing the address.

20 Claims, 10 Drawing Sheets

(56) References Cited

U.S. PATENT DOCUMENTS

| | | | |
|---|---|---|---|
| 2011/0035437 A1* | 2/2011 | Toumura | H04L 67/1002 |
| | | | 709/203 |
| 2014/0129669 A1* | 5/2014 | Wiseman | G06F 16/9558 |
| | | | 709/217 |
| 2015/0106730 A1 | 4/2015 | Wang et al. | |
| 2016/0026896 A1* | 1/2016 | Dwan | G06T 11/60 |
| | | | 382/225 |
| 2017/0075877 A1* | 3/2017 | Lepeltier | G06F 40/117 |
| 2017/0123751 A1 | 5/2017 | Sigurdsson et al. | |
| 2017/0177194 A1* | 6/2017 | Lyons | H04L 67/02 |
| 2017/0255835 A1* | 9/2017 | Price | G06K 9/6282 |
| 2020/0313895 A1* | 10/2020 | Ha | H04L 9/0643 |

OTHER PUBLICATIONS

"Pip install dhash", dhash 1.3, Last released: Aug. 23, 2017, 7 pages. https://pypi.org/project/dhash/.
Mell et al., "The NIST Definition of Cloud Computing", Recommendations of the National Institute of Standards and Technology, Sep. 2011, U.S. Department of Commerce, 7 pages.

\* cited by examiner

CONTENT SHARING USING ADDRESS GENERATION

BACKGROUND

The present disclosure relates to sharing of content between computing devices, and more specifically, to generation of electronic addresses for sharing of content across computing devices.

Content is commonly shared between computing devices over various networks. For example, screen sharing allows a host to share their display with users of other computing devices. Typically, the host must share a Uniform Resource Locators (URL) and account information to allow another user to access their display. The information is typically provided at a specific point in time, such as the beginning of a presentation, and users that miss the presentation of the URL and account information do not have access to the display. Further, this method of sharing screens requires a user to manually input the URL and account information to access the display.

SUMMARY

According to embodiments of the present disclosure, a method for sharing content is provided. An image of content is obtained. An address is generated based on the image using a set of predefined rules. The address is associated with the content. The content is provided to a computing device in response to the computing device accessing the address. This may allow the content to be shared at an address that is automatically generated and can be generated by other computing devices using the same image.

According to further embodiments of the method, the set of predefined rules include calculating a hash value based on the image. This may allow for different computing devices to generate the same unique address for the image.

According to embodiments of the present disclosure, a method for receiving content is provided. An image of content is captured. An address is generated based on the image using a set of predefined rules. The address is accessed. The content is received in response to accessing the address. This may allow a user a simple way to receive content that they are viewing.

Embodiments of the present disclosure further provide a system and computer program product for performing the methods.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
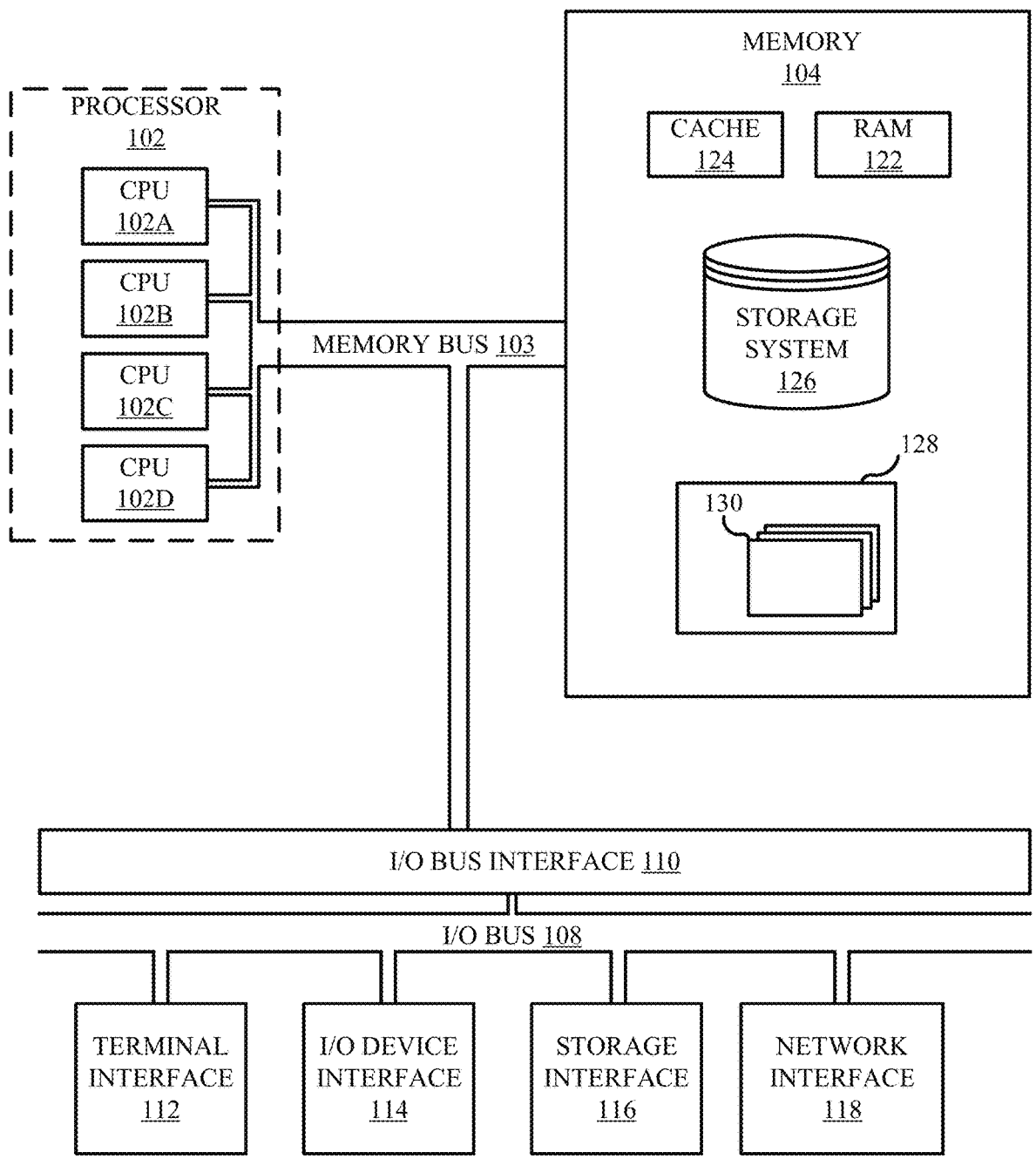
FIG. 1 depicts a high-level block diagram of an example computer system according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to content sharing, and more particular aspects relate to content sharing by generating an address based on the content. While the present disclosure is not necessarily limited to such applications, various aspects of the disclosure may be appreciated through a discussion of various examples using this context.

Providing access to content displayed by a host device, such as screen sharing, can be cumbersome to implement. According to some prior art methods, the host must provide a URL and account information such as a user identification and password to other users for them to manually enter using their computing devices. Typically, this information must be provided in advance of a presentation or at the beginning of a presentation. Aspects of the present disclosure provide for a method of providing access to displayed content that is less cumbersome on hosts and users. Aspects of the present disclosure may provide a user viewing displayed content to easily gain access to content without any access information needing to be added to the content by the host.

Embodiments of the present disclosure may provide for sharing of content between electronic devices by generating an address using an image of the content. A host may communicate the content to a delivery server while simultaneously displaying the content via another mechanism such as, for example, a projector. The delivery server may select an image of the content and generate an address based on the image. The delivery server may then associate the content with the generated image. A user that is viewing the content displayed by the host may capture an image of the displayed content using a computing device. The user's computing device may generate the same address generated by the delivery server based on the image of the displayed content. The user's computing device may access the address, and, in response, the delivery server may provide the content to the user's computing device. Thus, an image of the content can be used by different computing devices to generate the same address without the image of the content specifying any address information.

The content may be any content capable of being displayed. For example, in screen sharing embodiments, the content may be part or all of the host device's screen. In some embodiments, the content may be a slide presentation. In some embodiments, the content may be a video. The host device may display its content using any display device such as, for example, a monitor or a projector. As discussed herein, the display of the content does not need to include any address information.

The same content that is displayed may be communicated to the delivery server. In some embodiments, the host device streams the content to the delivery server. For example, the host device may stream its screen that is currently being displayed to the delivery server. In some embodiments, the host device may communicate a static part of the content, such as a particular slide of a slide presentation, to the delivery server. The host device may then communicate additional static parts of the content at a later time such as, for example, when the host device starts to display a different slide of a presentation. In some embodiments, the host device may provide the entire content to the delivery server before displaying all or part of the content. For example, the host device may upload a file of a presentation prior to displaying the presentation to an audience. The host device may also communicate audio that accompanies the visual content.

The delivery server may be configured to select an image of the provided content. For example, for streaming content, the server may be configured to select a single image of the screen from the stream. For a static part of the content, the delivery server may simply select the provided static part of the content. When the entire content is provided, the delivery server may select, for example, an image at the beginning of the content.

The delivery server may generate an address using the selected image. The address may be generated using a set of predefined rules. In some embodiments, a hash value may be calculated based on the image and the hash value is used in a predefined Uniform Resource Locator (URL) to generate the address. In some embodiments, the hash value is calculated based on the whole image. For example, the hash value may be calculated using a difference hash (dhash) algorithm. In some embodiments, the delivery server may be configured to read character strings in the image using optical character recognition (OCR) technology and may calculate a hash value based on the character strings. In some embodiments, the hash value may be added on to a predefined base address associated with the delivery server to generate the address. For example, a generated URL may be in the format http://{delivery provider}/{hash value} where {delivery provider} is a base address for accessing the delivery provider and {hash value} is the calculated has value. Thus, an address may be generated by the delivery server using an image that does not specifically include any address information.

The delivery server may provide the content from the host to computing devices that access the generated address. In some embodiments, the delivery server provides a stream of the shared screen. In these streaming embodiments, the delivery server may record the stream such that the computing devices may access earlier portions of the content. In embodiments where the entire content has been provided to the delivery server, the delivery server may provide the entire content to the computing device via, for example, download or streaming. In some embodiments, the content is provided by redirecting the computing devices to a different address than the generated address, where the computing devices may stream, download, or otherwise access the content. In some embodiments, the delivery server further provides audio from the host along with the visual content.

The delivery server may repeat the process of selecting an image and generating an address. In some embodiments, the delivery server may select an image at predetermined time periods of real time for generating an address. For example, the delivery server may select an image in real time every 20 seconds from streaming content from the host. Alternatively, where the entire content is received from the host, the delivery server may select images at predetermined periods of run time of the content and generate addresses. For example, for a video, the delivery server may select an image at every 30 seconds of run time. In embodiments where static parts of the content are received, the delivery server may generate an address for each static part received.

The delivery server may invalidate generated addresses over time. In some embodiments, the delivery server may invalidate an address after a specified period of time has elapsed since the address was generated. In some embodiments, the delivery server invalidates the oldest generated address when the number of addresses for a particular content exceeds a threshold. For example, the delivery server may invalidate the first generated address for a particular content when an eleventh address is generated for the content and the threshold is ten addresses for the content.

Users may generate the same addresses generated by the delivery server using images of the content captured by a camera. For example, a user that is viewing a display of the content by the host system may capture an image using a camera associated with their computing device.

The user's computing device may generate an address from the content in the captured image using in the same way as the delivery server. The address may be generated using the same set of predefined rules as the delivery server.

In response to generating the address, the user's computing device may access the generated address to access the content. For example, the user's computing device may open a generated URL using a web browser to download, stream, or otherwise access the content.

In some embodiments, the host may provide to the delivery server the location where the content is being displayed. For example, the host may provide a global positioning system (GPS) location identified by the host device. In these embodiments, the delivery server may receive a location, such as GPS location, from the computing devices accessing the generated address. The delivery server may determine whether the computing devices are authorized to access the content based on their location and the host location. For example, there may be a threshold distance from the host location that the computing device location must be within. If the computing device is not authorized based on their location, the delivery server may deny access to the content. This may provide extra security that restricts access to the content to those that are within a specified range of the host providing the content.

Referring now to FIG. 1, shown is a high-level block diagram of an example computer system 101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 101 may comprise one or more CPUs 102, a memory subsystem 104, a terminal interface 112, a storage interface 116, an I/O (Input/Output)

device interface 114, and a network interface 118, all of which may be communicatively coupled, directly or indirectly, for inter-component communication via a memory bus 103, an I/O bus 108, and an I/O bus interface unit 110.

The computer system 101 may contain one or more general-purpose programmable central processing units (CPUs) 102A, 102B, 102C, and 102D, herein generically referred to as the CPU 102. In some embodiments, the computer system 101 may contain multiple processors typical of a relatively large system; however, in other embodiments the computer system 101 may alternatively be a single CPU system. Each CPU 102 may execute instructions stored in the memory subsystem 104 and may include one or more levels of on-board cache.

System memory 104 may include computer system readable media in the form of volatile memory, such as random access memory (RAM) 122 or cache memory 124. Computer system 101 may further include other removable/non-removable, volatile/non-volatile computer system storage media. By way of example only, storage system 126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 104 can include flash memory, e.g., a flash memory stick drive or a flash drive. Memory devices can be connected to memory bus 103 by one or more data media interfaces. The memory 104 may include at least one program product having a set (e.g., at least one) of program modules that are configured to carry out the functions of various embodiments.

One or more programs/utilities 128, each having at least one set of program modules 130 may be stored in memory 104. The programs/utilities 128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 130 generally perform the functions or methodologies of various embodiments.

Although the memory bus 103 is shown in FIG. 1 as a single bus structure providing a direct communication path among the CPUs 102, the memory subsystem 104, and the I/O bus interface 110, the memory bus 103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 101 may, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices may be connected directly to one or more system I/O buses.

In some embodiments, the computer system 101 may be a multi-user mainframe computer system, a single-user system, or a server computer or similar device that has little or no direct user interface, but receives requests from other computer systems (clients). Further, in some embodiments, the computer system 101 may be implemented as a desktop computer, portable computer, laptop or notebook computer, tablet computer, pocket computer, telephone, smart phone, network switches or routers, or any other appropriate type of electronic device.

It is noted that FIG. 1 is intended to depict the representative major components of an exemplary computer system 101. In some embodiments, however, individual components may have greater or lesser complexity than as represented in FIG. 1, components other than or in addition to those shown in FIG. 1 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
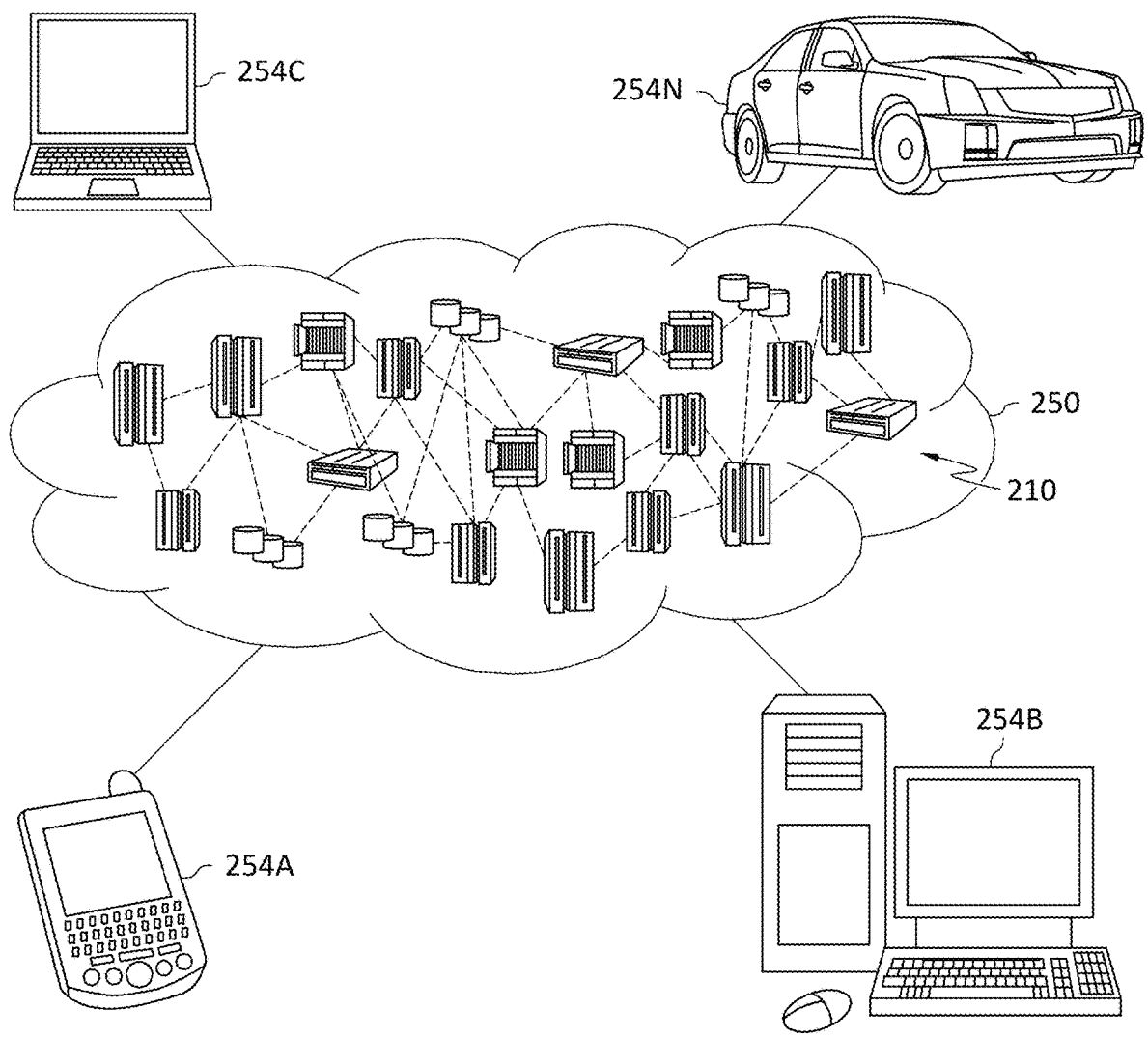
FIG. 2 depicts a cloud computing environment according to an embodiment of the present disclosure.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
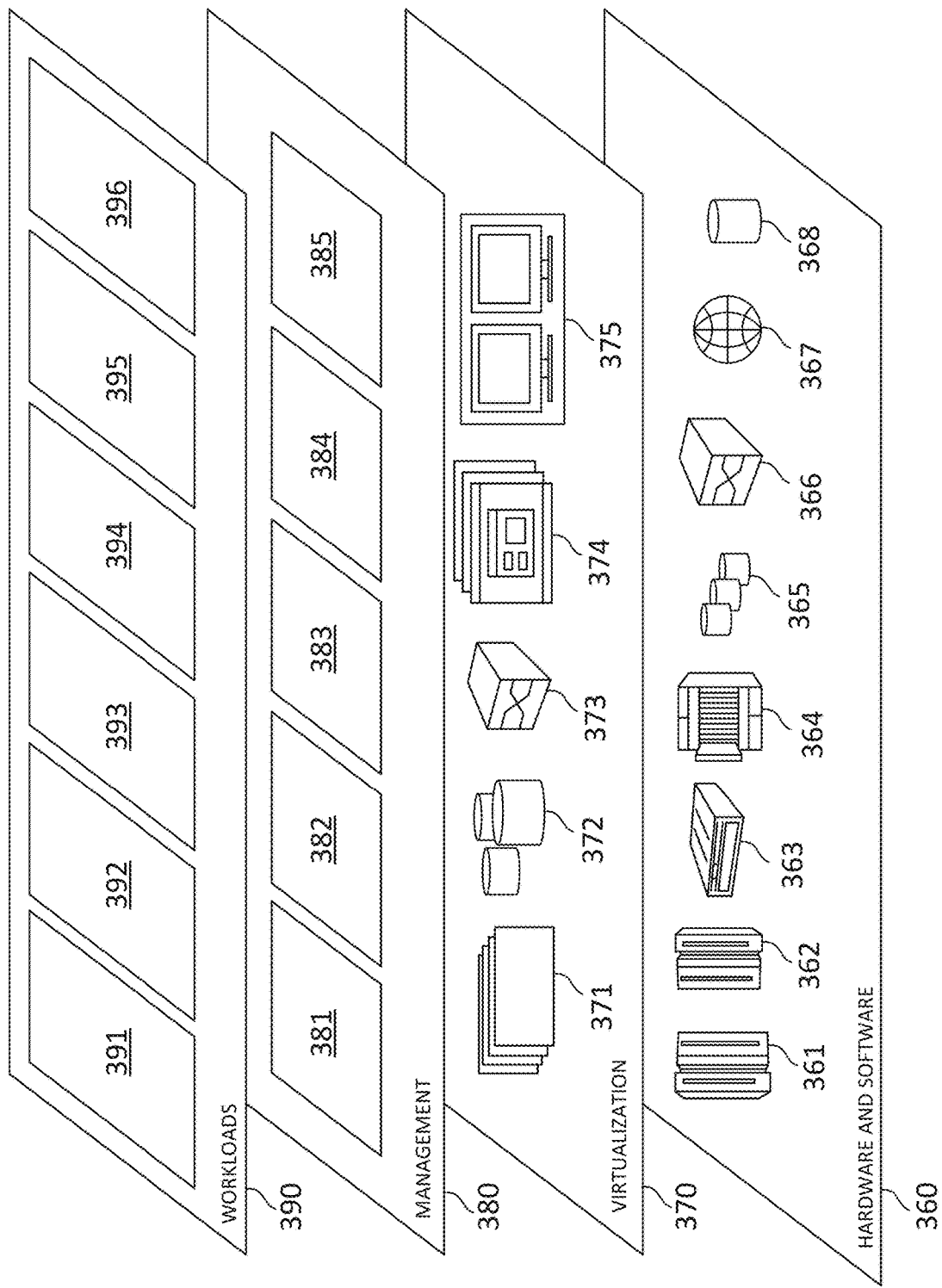
FIG. 3 depicts abstraction model layers according to an embodiment of the present disclosure.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and content sharing 396.

Figure 4:
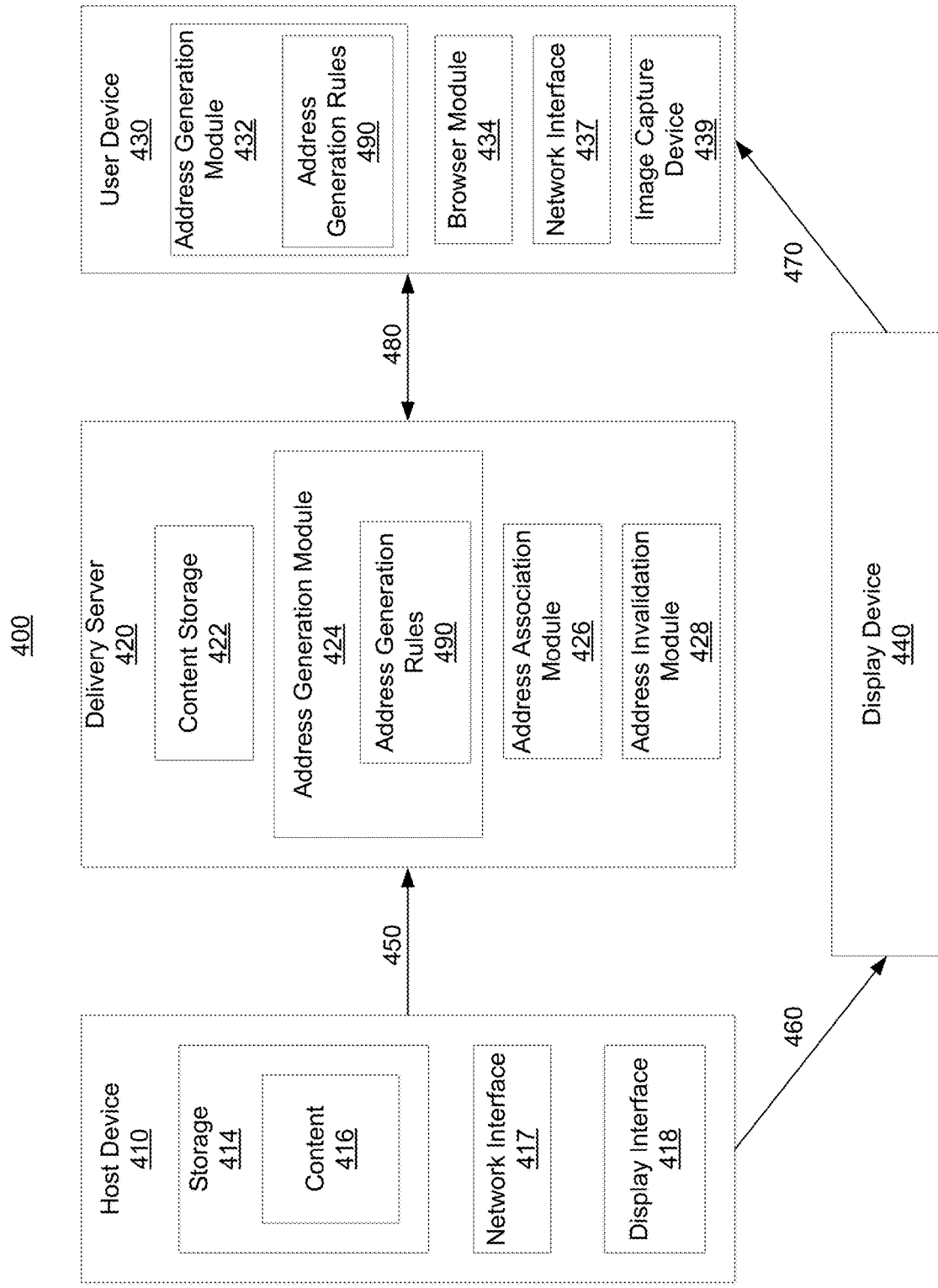
FIG. 4 depicts a block diagram of an example system for sharing content according to embodiments.

Referring now to FIG. 4, a block diagram of an example system 400 for sharing content is depicted according to embodiments. System 400 may include a host device 410, a delivery server 420, a user device 430, and a display device 440. The modules described herein may be implemented as hardware, software, or any combination thereof.

Host device 410 may be any suitable computing device such as, for example, a desktop computer, laptop computer, or tablet. Host device 410 may be computer system 101 described in reference to FIG. 1. Host device 410 may include a storage 414, a network interface 417, and a display interface 418. Host device 410 may be configured to perform method 500 described in reference to FIG. 5. Storage 414 may store content 416. Host device 410 may be configured to display the content 416 by communicating the content to display device 440 over a connection 460 via display interface 418. Host device 410 may be further configured to communicate content 416 to delivery server 420 over one or more networks 450 via network interface 417.

Delivery server 420 may be implemented using any suitable computing device. Delivery server 420 may be computer system 101 described in reference to FIG. 1. In some embodiments, delivery server 420 may be implemented in a cloud computing environment as described herein. Delivery server 420 may be configured to perform method 600 described in reference to FIG. 6 or method 700 described in reference to FIG. 7. Delivery server 420 may be configured to store content 416 in a content storage 422. Delivery server 420 may include an address generation module 424 that is configured to take an image from content 416 and generate an address based on the image using address generation rules 490. Delivery server 420 may further include an address association module 426 that is configured to associate generated addresses with content 416. Delivery server 420 may further include an address invalidation module configured to invalidate addresses that have become expired.

User device 430 may be any suitable computing device such as, for example, a laptop computer, tablet, or smartphone. User device 430 may be computer system 101 described in reference to FIG. 1. User device 430 may be configured to perform method 800 described in reference to FIG. 8. User device 430 may include an address generation module 432, a browser module, a network interface 437, and an image capture device 439. User device 430 may be configured to capture 470 an image of content 416 being displayed by display device 440 using image capture device 439. Image capture device 439 may be camera that is part of user device 430 or in communication with user device 430. For example, image capture device 439 may be a camera integrated into a smartphone or a webcam integrated into a laptop computer. Address generation module 432 may be configured to generate an address based on the captured image using address generation rules 490. As depicted, the generation rules 490 may be the same on delivery server 420 and user device 430 such that the addresses generated by the delivery server and the user device using the same image are the same address. Browser module 434 may be configured to access the generated address on the delivery server over one or more networks 480 via network interface 437.

Figure 5:
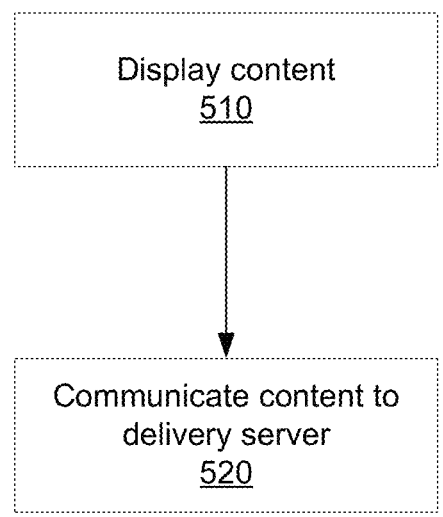
FIG. 5 depicts a flowchart of an example method for sharing content by a host device according to embodiments.

Referring now to FIG. 5, a flowchart of an example method 500 for sharing content by a host device is depicted according to embodiments. The host device may display the content using a display device per 510. For example, the host device may display the content using a monitor, a screen, or a projection device such that the content may be viewed by people. The host device may communicate the content to a delivery server per 520. A user of the host device may initiate execution of a program on the host device to cause the device to communicate content to the delivery server. For example, host device may communicate the screen of the host device that is currently being displayed to the delivery server.

The steps of method 500 may be performed in a different order than is depicted in FIG. 5. In some embodiments, step 520 may performed prior to step 510. In some embodiments, steps 510 and 520 may be executed concurrently, substantially concurrently, in a partially or wholly temporally overlapping manner. For example, the host device may communicate the content to the delivery server prior to displaying the content using a display device. In another example, the host device may display the content at the same time as the content is communicated to the delivery server.

Figure 6:
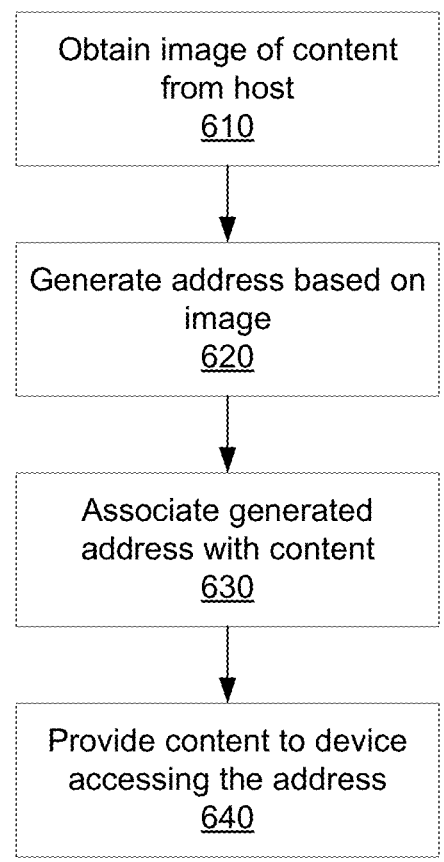
FIG. 6 depicts a flowchart of an example method for sharing content by a delivery server according to embodiments.

Referring now to FIG. 6, a flowchart of an example method 600 for sharing content by a delivery server is depicted according to embodiments. The delivery server may obtain an image of content from a host per 610. In some embodiments, the host may communicate the image of the content to the delivery server. In some embodiments, delivery server may select an image from content received from the host. The delivery server may generate an address based on the image per 620. The delivery server may generate the address using the image as described herein using a set of predefined rules. The delivery server may associate the generated address with the content per 630. For example, the delivery server may associate the content with the address such that a device that accesses the generated address receives the content or the delivery server may associate the address with another address such that a device accessing the generated address is redirected to another address for delivering the content. The delivery server may provide the content to a device accessing the address per 640. In some embodiments, the delivery server allows the device to download the entire content. In some embodiments, the delivery server provides a stream of the content to the device. In some embodiments, the delivery server allows the user device to access stored content from a time prior to the user device accessing the generated address. For example, where the content is being streamed from the host device, the delivery server may store the streamed content and make the previously streamed content accessible to the user device.

Figure 7:
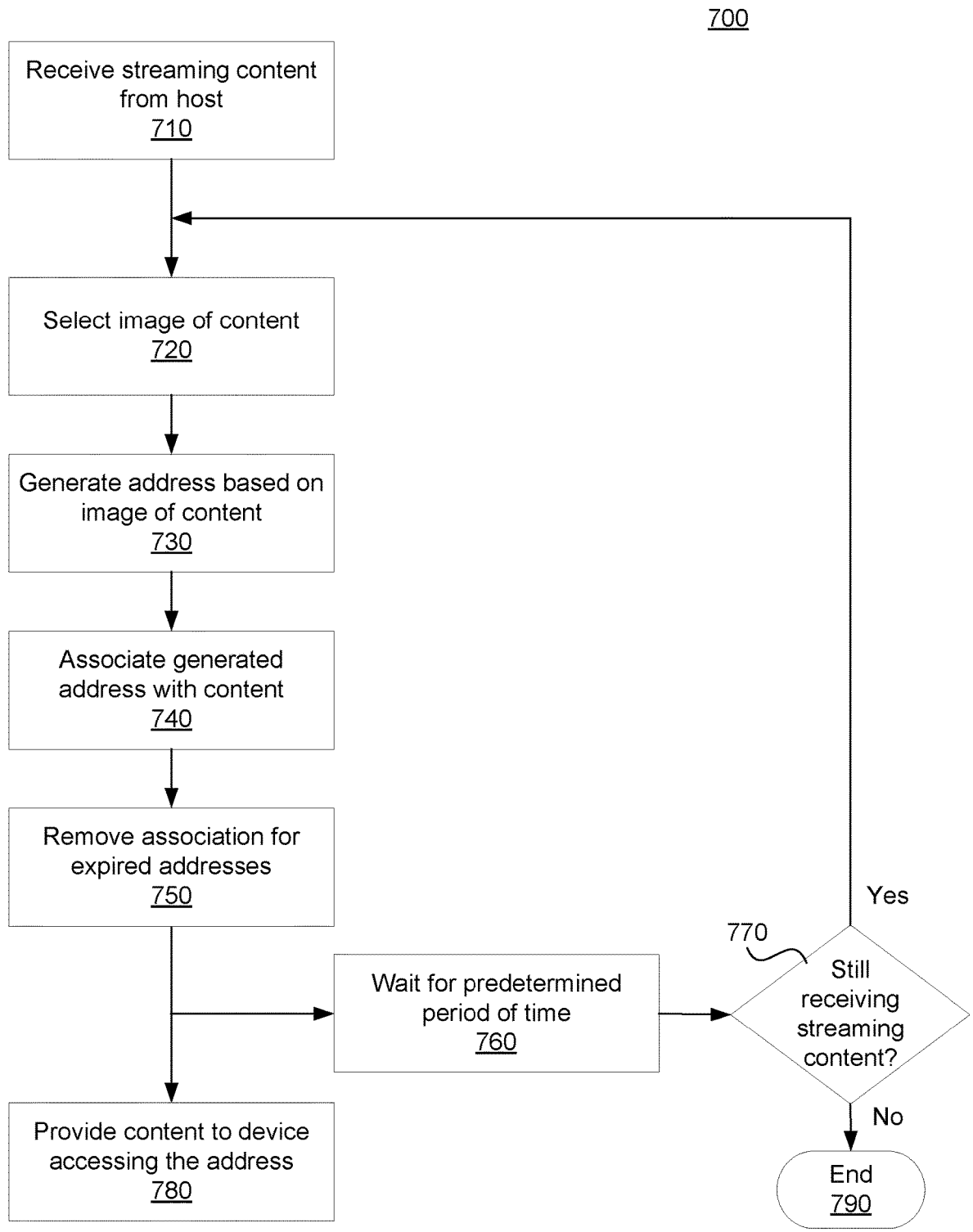
FIG. 7 depicts a flowchart of a second example method for sharing content by a delivery server according to embodiments.

Referring now to FIG. 7, a flowchart of a second example method 700 for sharing content by a delivery server is depicted according to embodiments. The delivery server may receive streaming content from a host per 710. For example, the host may be sharing its screen and the delivery server may receive the host screen from the host. The delivery server selects an image of the content per 720. For example, the delivery server may select a specific frame from streamed video content. The delivery server may generate an address based on the selected image per 730. The delivery server may generate the address using a set of predefined rules.

The delivery server may associate the generated address with the streaming content per 740. For example, the delivery server may configure the address to provide the streaming content to a user device that accesses the address or may configure the address to redirect a user device that accesses the address to another address that provides the streaming content. The delivery server may remove the association between the streaming content and expired addresses per 750. In some embodiments, the delivery server may be configured to retain less than a specified number of generated addresses for a specific content, such that the oldest generated address may become expired when the specified number of generated addresses is reached. In some embodiments, each generated address becomes expired after a specified period of time has elapsed since the address was generated.

The delivery server may provide the streaming content to a device that access generated addresses associated with the streaming content per 780. In some embodiments, the delivery server may directly provide the content to the device. In some embodiments, the delivery server may redirect the device to another address for accessing the content. The delivery server may wait for a predetermined period of time, per 760, prior to determining whether the streaming content is still being received from the host per 770. If the delivery server is no longer receiving the streaming content, the method may end per 790. If the delivery server is still receiving the streaming content, the delivery server may select another image of the streaming content per 720. The delivery server may repeat steps 720-780 as long as streaming content is still being received from the host.

Figure 8:
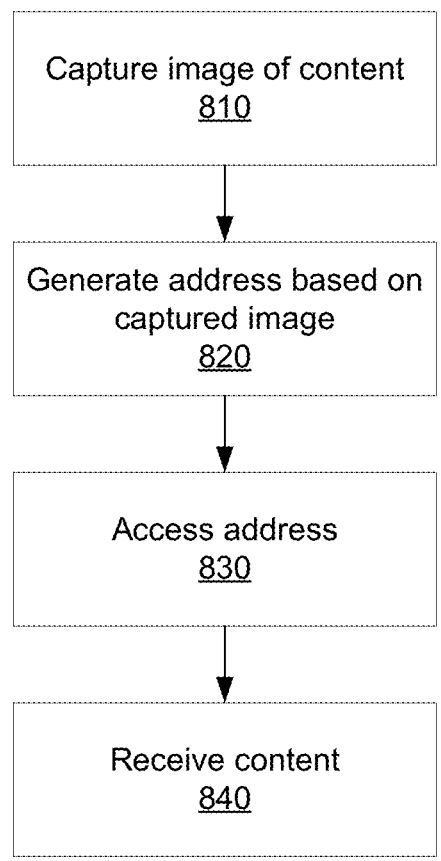
FIG. 8 depicts a flowchart of an example method for receiving shared content by a user device according to embodiments.

Referring now to FIG. 8, a flowchart of an example method 800 for receiving shared content by a user device is depicted according to embodiments. The user device may capture an image of content being displayed per 810. For example, the user device may capture an image of the content using a camera that is integrated into the user device or an external camera in communication with the user device. The user device may generate an address based on the captured image per 820. The user device may generate the address using a set of predefined rules. For example, the user device may generate a URL based on the image as described herein. The user device may access the generated address per 830. For example, the user device may open the generated address in a web browser. The user device may receive the content in response to accessing the generated address per 840. For example, the user device may download the content or receive a stream of the content.

Figure 9A:
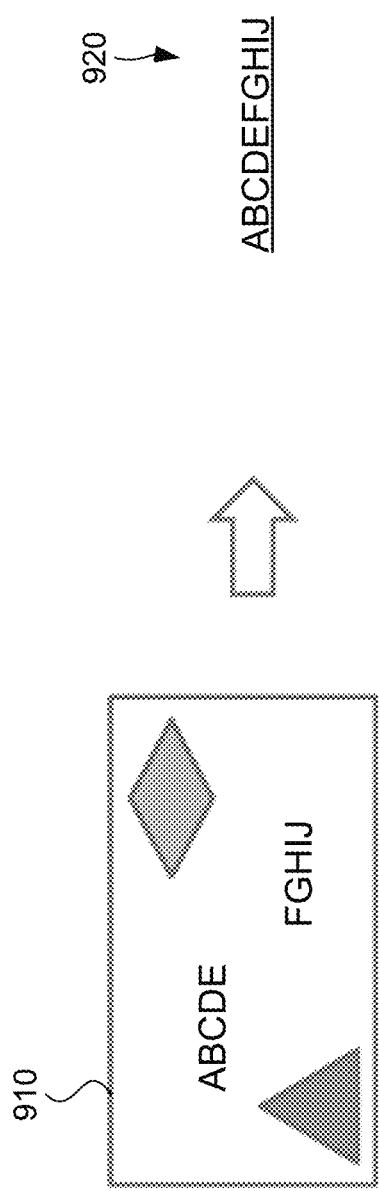
FIGS. 9A and 9B depict an illustration of an example method for generating a hash value according to embodiments.
Figure 9B:
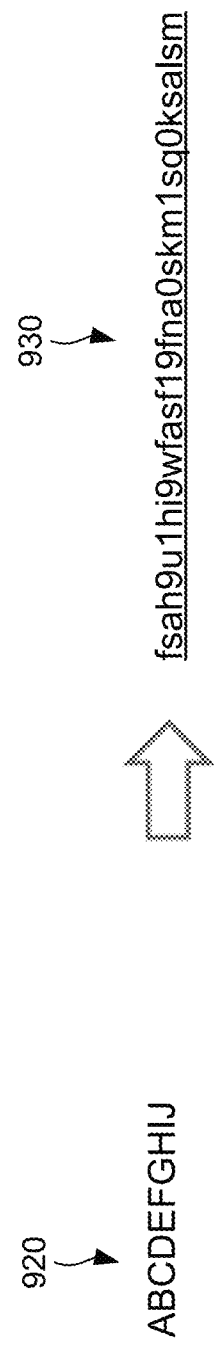

Referring now to FIGS. 9A and B, an illustration of an example method for generating a hash value is depicted according to embodiments. As shown in FIG. 9A, characters 920 may be read from an image 910. The characters may be read using OCR technology. As shown in FIG. 9B, a hash value 930 may be calculated based on the characters 920 read from the image. Any suitable hash algorithm may be used to generate the hash value. The hash value 930 may be used to generate a URL. For example, the hash value 930 may be used to generate the URL http://{application provider}/fsah9u1hi9wfasf19fna0skm1sq0ksalsm.

Figure 10:
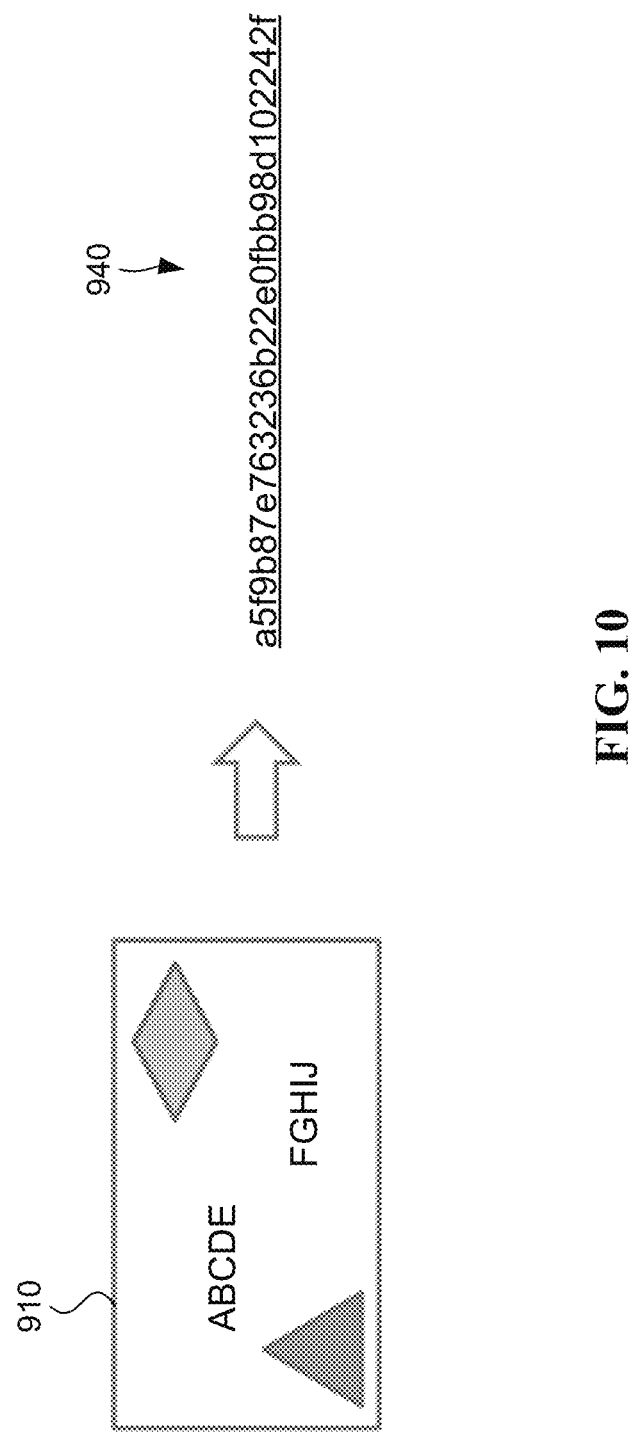
FIG. 10 depicts an illustration of a second example method for generating a hash value according to embodiments.

Referring now to FIG. 10, an illustration of a second example method for generating a hash value is depicted according to embodiments. As depicted, a hash value 940 may be calculated using the whole image 910. For example, a dhash algorithm may be used to calculate the hash value from the image. The hash value 940 may be used to generate a URL. For example, the hash value 940 may be used to generate the URL http://{application provider}/a5f9687e763236b22e0fbb98d102242f.

Embodiments of the present disclosure include a computer-implemented method for sharing content, the method including: obtaining an image of content; generating an address based on the image using a set of predefined rules; associating the address with the content; and providing the content to a computing device in response to the computing device accessing the address.

In some embodiments of the method, the address is a Uniform Resource Locator (URL).

In some embodiments of the method, providing the content includes redirecting the computing device to a second address.

In some embodiments of the method, providing the content includes streaming the content to the computing device.

In some embodiments, the method further includes invalidating the association between the address and the content in response to a number of generated addresses for the content exceeding a threshold number.

In some embodiments of the method, the set of predefined rules include calculating a hash value based on the image. In some embodiments of the method, the hash value is calculated based on the whole image. In some embodiments of the method, the hash value is calculated based on character strings read from the image.

In some embodiments of the method, the address is generated by adding the hash value to a predefined base address.

In some embodiments, the method further includes removing the association between the address and the content in response to determining that the address is expired. In some embodiments of the method, determining that the address is expired includes determining that a threshold number of addresses associated with the content has been reached. In some embodiments of the method, determining that the address is expired includes determining that a threshold period of time has elapsed since the address was generated.

In some embodiments, the method further includes: obtaining a second image of the content; generating a second address based on the second image using the set of predefined rules; associating the second address with the content; and providing the content to a second computing device in response to the second computing device accessing the second address. In some embodiments of the method, the second image of the content is selected based on predetermined period of time elapsing since obtaining the first image.

Embodiments of the present disclosure include a computer-implemented method for receiving content, the method including: capturing an image of content; generating an address based on the image using a set of predefined rules; accessing the address; and receiving the content in response to accessing the address.

Embodiments of the present disclosure include a computer program product for sharing content. The computer program product includes a computer readable storage medium having program instructions embodied therewith, the program instructions executable by a processor to cause the processor to perform the methods described herein.

Embodiments of the present disclosure include a system having one or more processors and a computer readable storage medium communicatively coupled to the one or more processors. The computer readable storage medium contains program instructions that when executed by the one or more processors cause the one or more processors to perform the methods described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for sharing content, the method comprising:
    obtaining a first image from a first part of an electronic content;
    generating a first address based on the first image using a set of predefined rules;
    after generating the first address, associating the first address with the content; and
    providing the content to a computing device in response to the computing device accessing the first address.

2. The method of claim 1, wherein the first address is a Uniform Resource Locator (URL).

3. The method of claim 1, wherein providing the content includes redirecting the computing device to a second address.

4. The method of claim 1, further comprising receiving a stream of the content from a host device, wherein obtaining the first image of the first part of the content includes selecting an image from the stream of the content, and wherein providing the content includes streaming the content to the computing device.

5. The method of claim 1, further comprising:
    generating a plurality of additional addresses for the content; and
    invalidating the association between the first address and the content in response to the first address and the plurality of additional addresses exceeding a threshold number of addresses associated with the content.

6. The method of claim 1, wherein the set of predefined rules include calculating a hash value based on the first image.

7. The method of claim 6, wherein the hash value is calculated by applying a hash algorithm to the whole first image.

8. The method of claim 6, wherein the hash value is calculated based on character strings read from the first image using optical character recognition.

9. The method of claim 6, wherein the first address is generated by adding the hash value to a predefined base address.

10. The method of claim 1, further comprising removing the association between the first address and the content in response to determining that the first address is expired.

11. The method of claim 10, wherein determining that the first address is expired includes determining that a threshold number of addresses associated with the content has been reached.

12. The method of claim 10, wherein determining that the first address is expired includes determining that a threshold period of time has elapsed since the address was generated.

13. The method of claim 1, further comprising:
    obtaining a second image of a second part of the content, wherein the second part of the content is different from the first part of the content;
    generating a second address based on the second image using the set of predefined rules, wherein the second address is different from the first address;
    associating the second address with the content; and
    providing the content to a second computing device in response to the second computing device accessing the second address.

14. The method of claim 13, wherein the second image of the content is selected based on predetermined period of time elapsing since obtaining the first image.

15. A computer program product for sharing content, the computer program product comprising a computer readable storage medium having program instructions embodied therewith, the program instructions executable by a processor to cause the processor to perform a method comprising:
    obtaining an image from an electronic content;
    generating an address based on the image using a set of predefined rules;
    after generating the address, associating the address with the content; and
    providing the content to a computing device in response to the computing device accessing the address.

16. A system comprising one or more processors; and a computer readable storage medium communicatively coupled to the one or more processors, the computer readable storage medium containing program instructions that when executed by the one or more processors cause the one or more processors to perform a method comprising:
    obtaining an image of from an electronic content;
    generating an address based on the image using a set of predefined rules;
    after generating the address, associating the address with the content; and
    providing the content to a computing device in response to the computing device accessing the address.

17. A computer-implemented method for receiving content, the method comprising:
    capturing an image of a display of an electronic content;
    generating an address based on the image using a set of predefined rules;
    accessing the address; and
    receiving the content in response to accessing the address.

18. The method of claim 17, wherein the set of predefined rules include calculating a hash value based on the image.

19. The method of claim 18, wherein the hash value is calculated based on the whole image.

20. The method of claim 17, wherein the image of part of the content is an image of a slide of a slide presentation, wherein generating the address includes applying a hash algorithm to the image of the slide, and wherein receiving the content in response to accessing the address is receiving the slide presentation.

* * * * *